United States Patent [19]

Ruben

[11] 3,940,284
[45] Feb. 24, 1976

[54] NICKEL OXIDE ELECTRIC CURRENT PRODUCING CELL

[76] Inventor: Samuel Ruben, 52 Seacord Road, New Rochelle, N.Y. 10801

[22] Filed: Jan. 21, 1975

[21] Appl. No.: 542,694

[52] U.S. Cl. .................. 136/24; 136/22; 136/28; 136/30; 136/111; 136/121
[51] Int. Cl.² ........................................ H01M 4/38
[58] Field of Search ......... 136/111, 24, 28, 30, 107, 136/22, 121

[56] References Cited
UNITED STATES PATENTS

| | | | |
|---|---|---|---|
| 2,664,453 | 12/1953 | Lang | 136/111 X |
| 3,485,672 | 12/1969 | Ruben | 136/24 |
| 3,765,944 | 10/1973 | Taplin et al | 136/121 |
| 3,773,557 | 11/1973 | Mead | 136/111 |

*Primary Examiner*—Howard S. Williams
*Assistant Examiner*—C. F. LeFevour

[57] ABSTRACT

The invention is a cell useful as a primary or secondary cell having a cathode comprising a porous electrically conductive solid graphite/silica gel bonded to a nickel screen and cathodically impregnated by an aherent deposition of nickel oxide.

6 Claims, 2 Drawing Figures

U.S. Patent Feb. 24, 1976 3,940,284

NICKEL OXIDE ELECTRIC CURRENT PRODUCING CELL

This invention relates to electric current producing cells and more particularly to primary and secondary alkaline cells in which the cathode is an oxide of nickel and the anode is amalgamated zinc or cadmium. The most important feature of novelty is the cathode structure and composition. Another feature of novelty is the pre-formed combination electrolyte-spacer.

An object of the invention is the provision of an improved nickel oxide electric current producing cell.

Among the specific objects is the provision in such a cell of a lower cost electrode than presently used sintered metal structures;
of a lighter weight electrode than those presently used;
having minimum self discharge characteristics;
having greater flexibility than presently used porous electrodes;
having a pre-formed single electrolyte-spacer.

A further object is the provision of a miniature primary cell suitable as the power source for electric watches and having a substantially higher potential than watch cells presently in use.

Still another object is the provision of an efficient low cost nickel-cadmium rechargeable cell.

Figure 1:
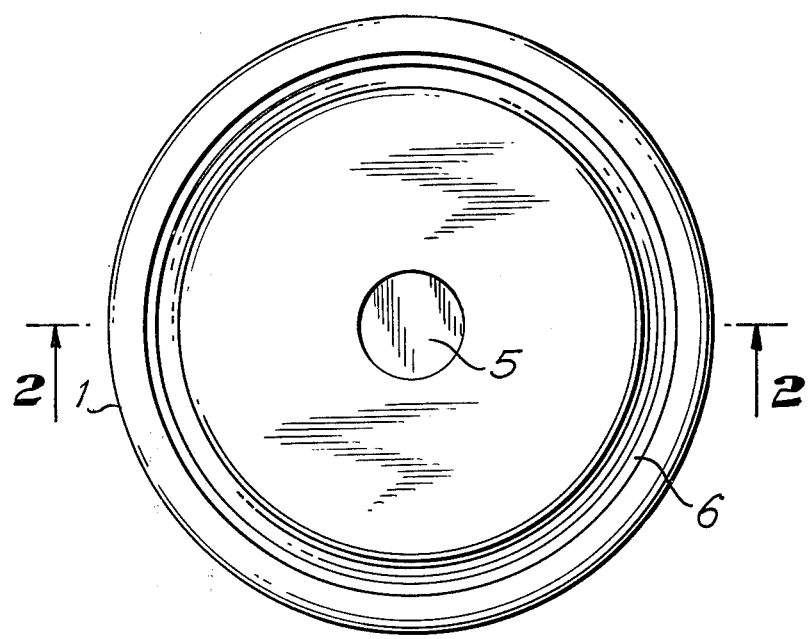
Figure 2:
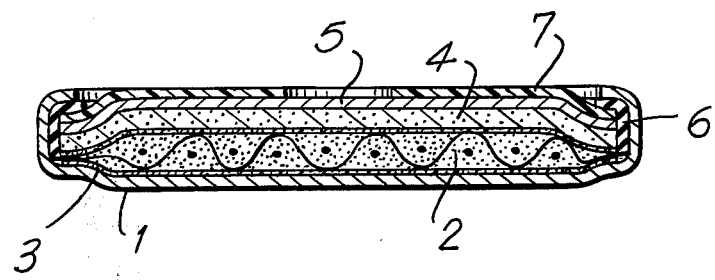

Other and further objects and advantages of the invention will become apparent from the following description, taken in conjunction with the accompanying drawings, in which FIG. 1 is a perspective view of an electric watch cell embodying the principles of the present invention; and FIG. 2 is a section taken on line 2—2 of FIG. 1.

The invention is a cell, useful as a primary or secondary cell, having a cathode comprising a porous electrically conductive solid graphite/silica gel bonded to a nickel screen and cathodically impregnated with an adherent deposition of nickel oxide. This cathode is preferably used in combination with a zincated lithium hydroxide cellulose gel electrolyte-spacer, and for primary discharge use, an anode of amalgamated zinc is employed, although cadmium may be utilized with consequent reduction in voltage.

The cathode is made in long strip form from 0.010 inch 40×40 nickel screen placed on a non-adherent surface, such as Saran or polyethylene sheet and coated with and the spaces between strands filled with a paste consisting of a mixture of finely divided or micronized carbon, preferably graphite and waterglass (sodium silicate 42 Be 1.260 specific gravity) in the proportions of 5 grams graphite and 7 grams waterglass and allowed to dry. After drying, the screen is baked for 4 hours at 80°C, then immersed in sulfuric acid of 1.400 specific gravity for 4 hours at 80°C, which converts the sodium silicate into solid silica gel or micro-porous silica. It is then washed in water containing 5% lithium hydroxide. A strongly bonded electrically conductive mixture of graphite and porous silica remains on the screen. After washing, the coated screen is made the cathode in a molten (85°C) nickel nitrate electrolyte, nickel anodes are placed on either side, and nickel hydroxide cathodically deposited on both the nickel screen and bonded graphite-silica. For a strip 1×4 inches, a cathodic current of 0.5 amp is applied for 4 hours, a bottom magnetic stirrer being utilized to agitate the solution. The deposition occurs within the pores of the porous graphite strip and on its surface. For some applications, the molten nitrate electrolyte may comprise 90% nickel nitrate and 10% cobalt nitrate, in which case the final oxide will comprise a small amount of cobalt oxide. After the desired amount of cathodically deposited nickel oxide is obtained, the coated strip is immersed in hot water to remove any retained nickel nitrate. In a final step, it is then made the anode in a 20% lithium hydroxide solution and converted into an active cathode-depolarizer of a higher oxide of nickel. After oxidation and activation, the strip is dried and assembled in a cell with the combined spacer and electrolyte as hereinafter described.

The cathode as described above is useful in both primary and secondary nickel oxide cells and when substituted for the sintered nickel oxide electrode presently used in rechargeable nickel-cadmium cells, very substantial savings are effected. It may also be used to advantage in sealed nickel-hydrogen secondary cells.

The electrolyte-spacer is made by impregnating a sheet of cotton cellulose paper, such as Dexter, Feltril, or Webril type papers, about 60 mils thick with a zincated lithium hydroxide electrolyte solution, draining and placing in a refrigerator in a sealed container for a sufficient length of time at a low temperature, such as for 8 hours at −10°C until a clear strong compressible non-fibrous self-sustaining irreversible gel sheet is produced. The electrolyte solution consists of 20 grams of Li OH per 100 m.l. of water having a lithium zincate content produced by dissolving and reacting 4 grams of zincoxide per 100 m.l. of the lithium hydroxide solution. The resultant gel sheet is allowed to come to and remain at room temperature (approximately 70°F) for 24 hours after which it is removed from the sealed shallow pan or container in which it has been processed, and punched into discs of required size. The discs are compressible and contain an adequate electrolyte content for the discharge reaction necessary for the coulombic capacity of the cathode.

While the application of the graphite/silica gel porous electrode has been described particularly for alkaline cells, it is also applicable to acid type cells, where oxides such as manganese oxide or lead peroxide can be electrolytically deposited into its porous structure and on its surface. It may be particularly usefully applied in my lead sulfamate cell.

While lithium hydroxide is the preferred electrolyte for a number of low current discharge applications and for producing the gel, other alkaline solutions, such as the hydroxides of sodium, potassium, caesium or rubidium may be used, dependent on the requirements as a rechargeable cell.

When used in a rechargeable cell with an amalgamated zinc anode made from either pressed amalgamated powder or plain or corrugated sheet, the gel electrolyte-spacer provides improved operation in that it hinders the formation of zinc dendrites which appear where other types of spacers are employed and which cause internal discharges.

Where cadmium is employed as the anode, it may be utilized in various forms such as in sheet, pressed powder or impregnated in a porous anode.

Nickel is the preferred screen material, although pure iron or titanium may be utilized. Where titanium is used with an acid electrolyte, a small amount of titanyl sulfate is added to the electrolyte.

The drawing shows a small flat cell useful as a powder supply for electric watches, calculators, and similar low current drain application. The container 1 is composed of No. 304 stainless steel, annealed after forming into a cup 1.00 inch in diameter and 0.127 inch high, the cup being chamfered at the bottom to a diameter of 0.75 inch. The cathode-depolarizer 2 is a disc of the nickel oxide impregnated nickel screen, produced as described above. The disc 2 is forced into stainless steel container 1, the oxide freed edges produced by the punching out of the disc, making positive contact with the inner walls of the container. A compressible disc 3 of the gelatinized zincated lithium hydroxide cellulose is placed over cathode-depolarizer 2, and 25 mil thick amalgamated zinc disc anode top 4, fitted into polyethylene grommet 5 is placed on compressible disc 3, which separates the anode and cathode. The zinc anode may be amalgamated by immersion in a 5% solution of mercuric nitrate, washed and allowed to stand until the mercury diffuses into the disc. Prior to insertion of anode disc 4 in the grommet, it is covered on its outer side with an adhesive layer of polyethylene tape 6 having a hole punched in its center to allow contact. After the cell is assembled, the top part of the wall of container 1 is crimped on to the grommet insulated zinc top so as to maintain the active elements of the cell in pressure contact and to provide a hermetically sealed cell. A thin layer of an epoxy resin may be applied to the crimped edges to further seal the cell.

The cell described above has a potential of approximately 1.8 volts and a current output of about 0.22 amp. hr. per gram of oxide.

Because of the nature of its components, the cell can be produced in various forms and structures. The structure described above is particularly useful where only micro or milliampere outputs are necessary. Where heavier drains are required, large rectangular structures or cylindrical structures may be employed, utilizing the electrode and spacer-electrolyte members in wound form. Other structures, such as described in a number of my sealed alkaline cell patents, may also be utilized. Other suitable container materials may be employed in place of the stainless steel, such as common steel, nickel plated steel, or carburized steel.

I claim:

1. An electric current producing cell having a cathode comprising a porous electrically conductive finely divided coating of carbon/silica gel bonded to and filling the spaces of a metal screen and an adherent deposition of a metal oxide cathodically deposited on and impregnating said coated screen.

2. An electric current producing cell having a cathode comprising a porous electrically conductive solid graphite/silica gel bonded to a nickel screen and cathodically impregnated with an adherent deposition of nickel oxide.

3. An electric current producing cell having a cathode comprising a porous electrically conductive solid graphite/silica gel bonded to a nickel screen and cathodically impregnated with an adherent deposition of nickel oxide, an anode of cadmium and an alkaline electrolyte.

4. An electric current producing cell having a cathode comprising a porous electrically conductive solid grahite/silica gel bonded to a nickel screen and cathodically impregnated with an adherent deposition of nickel oxide, an anode of one of the metals amalgamated zinc and cadmium, and a self sustaining unitary electrolyte-spacer of zincated lithium hydroxide gelatinized cellulose interposed between and in contact with said anode and cathode, and a container in which said elements are housed.

5. The cell according the claim 4 characterized in that the container is formed from stainless steel and is the external cathode contact of said cell.

6. The cell according to claim 4 characterized in that the oxide coated nickel screen rests on the bottom of the container and uncoated portions thereof are in intimate pressure contact with said container.

* * * * *